United States Patent [19]

Cottatelucci

[11] Patent Number: 4,524,462

[45] Date of Patent: Jun. 18, 1985

[54] SYSTEM FOR JOINTLY TRANSMITTING HIGH-FREQUENCY AND LOW-FREQUENCY DIGITAL SIGNALS OVER A FIBER-OPTICAL CARRIER

[75] Inventor: Ezio Cottatelucci, Milan, Italy

[73] Assignee: Italtel Societa Italiana Telecomunicazioni S.p.A., Milan, Italy

[21] Appl. No.: 524,024

[22] Filed: Aug. 17, 1983

Related U.S. Application Data

[63] Continuation-in-part of Ser. No. 507,830, Jun. 24, 1983.

[30] Foreign Application Priority Data

Jun. 24, 1982 [IT] Italy .................... 22043 A/82
Oct. 27, 1982 [IT] Italy .................... 23956 A/82

[51] Int. Cl.³ .................................... H04B 9/00
[52] U.S. Cl. ........................... 455/608; 375/17
[58] Field of Search ............. 375/17, 20, 25, 112, 375/113, 114; 455/608; 370/110.1, 111, 112

[56] References Cited

U.S. PATENT DOCUMENTS 4,001,578 1/1977 Cook et al. .................... 455/608
4,006,304 2/1977 Sell ............................... 455/608

Primary Examiner—Joseph A. Orsino, Jr.
Attorney, Agent, or Firm—Karl F. Ross; Herbert Dubno

[57] ABSTRACT

Simultaneous transmission of a high-frequency primary bit stream and a low-frequency secondary bit stream over a physical carrier such as an optical fiber is made possible by using a ternary representation of the primary bit stream, such as the HDB3 code, and converting it into a binary configuration at twice the original bit rate with its three levels represented by as many two-bit combinations, as in the HDB3/CMI code, leaving unused a fourth such combination to be utilized for conveying a logical "1" of the secondary bit stream. A transcoder at a transmitting station modifies the outgoing double-bit pulse train, in the presence of such a logical "1", by replacing at least one bit combination thereof—specifically one representing ternary "+1" or "−1" by the unused combination—such as the pair "1-0"—which is detected by a decoder at an associated receiving station and is utilized in reconstituting the original secondary bit stream, separated from a replica of the original primary bit stream. Two mutually independent secondary bit streams can be jointly conveyed by using the "+1" and the "−1" bit combination.

9 Claims, 14 Drawing Figures

SYSTEM FOR JOINTLY TRANSMITTING HIGH-FREQUENCY AND LOW-FREQUENCY DIGITAL SIGNALS OVER A FIBER-OPTICAL CARRIER

CROSS-REFERENCE TO RELATED APPLICATION

This is a continuation-in-part of my copending application Ser. No. 507,830 filed June 24, 1983.

FIELD OF THE INVENTION

My present invention relates to a data-transmitting system of the type using a physical carrier, such as an optical fiber, which does not distinguish between pulses of different polarities and is therefore mainly suitable for the transmission of binary information.

BACKGROUND OF THE INVENTION

Instances arise when the same physical carrier is to be employed for the joint transmission of two data streams significantly differing in their bit rates, namely a primary bit stream of relatively high pulse cadence or repetition frequency—corresponding to a short cycle length—and a secondary bit stream of relatively low cadence and large cycle length. The secondary bit stream may contain, for example, digitized voice samples in a telecommunication system serving for telephone traffic and high-speed data transmission; that bit stream could also carry supervisory information relating to the free or busy state of a line, the address of a calling or called subscriber, the existence of a malfunction and so on. With metallic conductors serving as the physical carrier, a line code utilized for the primary data stream will generally occupy a limited band of the available frequency spectrum, allowing other portions of that spectrum to be used for the secondary data flow; that part of the spectrum may range, for example, between zero and a frequency on the order of 1/100 of the bit frequency of the primary stream. In a coaxial cable, moreover, speech transmission may be confined to a single pair of copper wires while other conductors convey the primary data flow.

When the carrier is an optical fiber, different bands of the frequency spectrum cannot be readily separated by filtering. The use of metallic wiring alongside such a fiber becomes ever less economical as improvements in fiber-optical technology enable a wider spacing of signal repeaters or regenerators along the line. Such conductors also tend to create interferences due to stray currents and may attract electrical discharges in a thunderstorm.

The use of a separate second fiber for the additional data flow is also uneconomical since both fibers would have to undergo signal regeneration in the associated repeater stations.

There is further known a technique termed "bit insertion" which involves a multiplexing of the two data streams with resulting increase in the overall bit frequency. Moreover, the equipment needed for combining and separating these interleaved bit streams is rather cumbersome and expensive.

OBJECTS OF THE INVENTION

The general object of my present invention, like that of my copending application identified above, is to provide a system for the joint transmission of high-frequency and low-frequency digital signals over a physical carrier such as an optical fiber which obviates the disadvantages described above.

A more particular object is to provide means in such a system for jointly transmitting and separating detecting information relating to two mutually independent secondary bit streams.

SUMMARY OF THE INVENTION

In data transmission it is frequently desirable to avoid lengthy unbroken series of bits of the same logical value, i.e. "0's" or "1's". Various codes have therefore been developed in which, at the cost of doubling the bit rate, the representation of these logical values is varied to change the signal level within a cycle or between adjoining cycles. Thus, for example, the known HDB3 code uses three signal levels (+1, 0 and −1) with alternation between positive and negative signs to represent consecutive logical "1's". A binary version of this ternary code, known as HDB3/CMI, replaces each of the three signal levels thereof by a respective bit pair as follows:

| HDB3 | HDB3/CMI |
|---|---|
| +1 | 1—1 |
| 0 | 0-1 |
| −1 | 0—0 |

Thus, the HDB3/CMI code utilizes three out of the four possible 2-bit combinations, the fourth combination "1-0" being unused. Not more than three consecutive "0" or "1" bits can occur in any data stream based thereon.

In accordance with my present invention, and as disclosed in my copending application, a transmitting station—provided with a first data source emitting a ternary representation of a primary bit stream and a second data source emitting a secondary bit stream of substantially greater cycle length—comprises transcoding means interposed between the data source and an associated physical carrier, specifically an optical fiber, for converting the primary bit stream into a configuration of twice the bit rate thereof with three out of four possible 2-bit combinations symbolizing respective levels of that ternary representation, as discussed above with reference to the HDB3 and HDB3/CMI codes. In the presence of a logical "1" in the secondary bit stream, as determined by differentiation and bistable means, a bit pair constituting the fourth 2-bit combination (specifically "1-0") is substituted by the transcoding means for one of the three combinations conventionally used in the binary configuration referred to. At an associated receiving station, the presence of this normally unused bit pair is detected by decoding means and its recurrences are utilized by timing means, in a manner known per se, to determine the cycle length of the second bit stream. The receiving station further has first and second output means coupled to the decoding means, the first output means generating a replica of the primary bit stream from the incoming pulse train while the secondary bit stream is reconstructed by the second output means from the recurrences of the nonconventional bit pair.

As pointed out in my copending application, any of the three conventional bit combinations may be used in the reconfiguration since its replacement by the unconventional bit pair at intervals greatly exceeding the cycle length of the primary bit stream will not significantly affect the intelligibility of the message conveyed thereby. The reconfiguration, however, ought to be limited to a predetermined bit pair of the conventional triad which occurs frequently enough in the primary data flow to be of use for the conveyance of the secondary signal. The particular embodiment described in the copending application comprises discriminating means responsive to the 2-bit combination which symbolizes that "zero" level. In some situations, however, a different bit combination will have to be selected for reconfiguration; one such instance may occur when the primary data flow constitutes a so-called alarm-inhibition signal (AIS) consisting of an unbroken series of binary "1's". The embodiments described hereinafter, therefore, comprise discriminating means responsive to bit combinations representing ternary "+1" and/or "−1", constituted by pairs of identical bits ("1-1" or "0-0", respectively) in the HDB3/CMI code. Since the changeover from such a bit pair to the irregular combination "1-0" as well as the restoration of the original pair requires the replacement of only one bit in each instance, these embodiments also entail a considerable circuital simplification compared with my earlier disclosure. Thus, the transcoder at the transmitting end and the decoder at the receiving end can perform the requisite substitution during half a cycle of the primary bit stream with the aid of a coincidence (AND, NAND or NOR) gate receiving a clock pulse in either the first or the second half of a cycle.

BRIEF DESCRIPTION OF THE DRAWING

The above and other features of my invention will now be described in detail with reference to the accompanying drawing in which.

SPECIFIC DESCRIPTION

Figure 1:
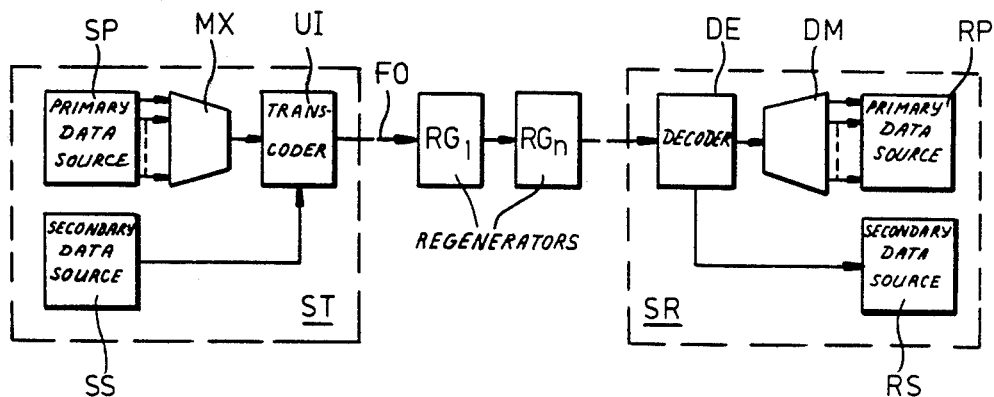
FIG. 1 is an overall block diagram of a signal-transmitting system according to my invention.

FIG. 1 schematically illustrates a communication system with a transmitting station ST and a receiving station SR interconnected by a signal link in the form of an optical fiber FO. The fiber is divided into a number of segments separated by a series of signal regenerators of which only two, respectively designated $RG_I$ and $RG_n$, have been illustrated.

Transmitting station ST comprises a number of primary data sources SP selectively connectable, via a multiplexer MX, to a transcoder UI designed to illuminate the input end of fiber FO with a series of light pulses basically conforming to the binary configuration HDB3/CMI, referred to hereinafter as the line code. Unless the sources SP already emit data streams in the ternary HDB3 form, multiplexer MX converts their binary signals into that form. Transcoder UI also receives a binary stream of secondary data, at a pulse rate considerably lower than that of the primary data, from a source SS.

Station SR comprises a decoder DE which receives the conveyed light signals from fiber FO and separates the primary and secondary data from each other. A pulse train corresponding to the incoming flow of primary data is selectively fed, via a demultiplexer DM, to a plurality of destinations RP, preferably after reconversion to binary form by conventional means; the superimposed flow of secondary data is directed to a receiver RS therefor.

Figure 2:
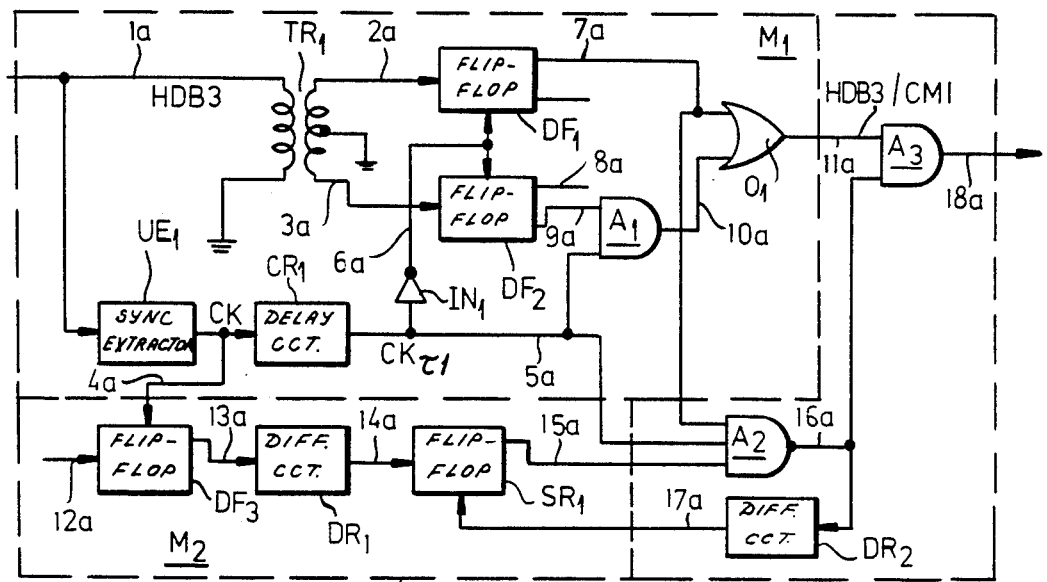
FIG. 2 is a more detailed circuit diagram of a transcoder forming part of a transmitting station included in the system of FIG. 1.

In FIG. 2 I have shown details of the transcoder UI of transmitting station ST (FIG. 1) which is divided into three sections $M_1$–$M_3$. Section $M_1$ changes an incoming flow of primary data, having the configuration HDB3 illustrated in graph 1a of FIG. 3, into the line code HDB3/CMI illustrated in graph 11a thereof. Section $M_2$ receives the flow of secondary data (graph 12a, FIG. 3) to be superimposed upon the HDB3/CMI pulse train and, in response to any "0-1" transition of this binary flow, generates a gating pulse of limited length shown in graph 15a of FIG. 3. Section $M_3$, responsive to signals from sections $M_1$ and $M_2$, causes a reconfiguration of a bit pair "1-1" in a cycle of the outgoing HDB3/CMI pulse train in response to the aforementioned "0-1" transition.

More particularly, transcoder section $M_1$ comprises an input transformer $TR_1$ whose unbalanced primary winding is energized with the ternary pulse train 1a and whose secondary winding, having a grounded center tap, acts as a rectifier by inverting the polarity of the negative pulses of HDB3 train 1a whereby two positive pulses sequences, illustrated in graphs 2a and 3a, appear at opposite terminals thereof. Pulses 2a and 3a are fed to data inputs of respective flip-flops $DF_1$ and $DF_2$ which lie in symmetrical branches of a main signal channel and are both switchable by the leading edges of clock pulses $\overline{CK_{T1}}$ illustrated in graph 6a; these clock pulses, of period t, are derived from the rhythm of train 1a with the aid of a conventional sync extractor $UE_1$ followed by a delay circuit $CR_1$ which produces pulses $CK_{T1}$ (graph 5a) transmitted to the switching inputs of the flip-flops through an inverter $IN_1$. Extractor $UE_1$ generates a pulse train CK (graph 4a); pulse trains $Ck_{T1}$, $\overline{CK_{T1}}$ are phase-shifted with reference to train CK.

Although transformer $TR_1$ also produces negative-going pulses, these have been omitted from graphs 2a and 3a since they are not distinguished from zero voltages by the associated flip-flops $DF_1$ and $DF_2$.

Flip-flop $DF_1$, when set by a clock pulse $\overline{CK_{T1}}$ in the presence of a positive pulse 2a, emits a lengthened pulse (graph 7a) encompassing a full cycle t of train 1a. A similarly lengthened pulse 8a appears on the set output of flip-flop $DF_2$ whenever a clock pulse $\overline{CK_{T1}}$ coincides with a pulse 3a. The negation 9a of pulse 8a is fed from the reset output of flip-flop $DF_2$ to one input of an AND gate $A_1$ whose other input receives the clock pulses $CK_{\tau 1}$. Flip-flops $DF_1$ and $DF_2$ can be described as discriminating means since their output pulses $7a$ and $8a$ come into existence only when the incoming signal HDB3 flow of graph $1a$ has the signal level "+1" or "−1", respectively. AND gate $A_1$ emits a pulse train $10a$ which is fed, together with pulses $7a$ from flip-flop $DF_1$, to an OR gate $O_1$ whose output is the modulated HDB3/CMI train shown in graph $11a$.

Section $M_2$ comprises a flip-flop $DF_3$ whose data input is connected to the secondary data source SS of FIG. 1 and which is switchable by the leading edges of the clock pulses CK (graph $4a$) produced by sync circuit $UE_1$ when the signal $12a$ from that source goes positive. This section forms an ancillary signal channel including a differentiation circuit $DR_1$ which emits a positive spike $14a$, in response to the leading edge of a positive-going output pulse $13a$ of circuit $DF_3$, to the setting input of a flip-flop $SR_1$ whose set output delivers a positive pulse $15a$ to a NAND gate $A_2$ in section $M_3$ having a second input tied to the set output of flip-flop $DF_1$ and receiving clock pulses $CK_{\tau 1}$ on a third input. Gate $A_2$ normally conducts, as indicated in graph $16a$, to unblock an AND gate $A_3$ in section $M_3$ which passes the line code from OR gate $O_1$ as shown in graph $18a$. In the second half of a clock cycle of length t during which a discriminating pulse $7a$ coincides with a gating pulse $15a$, i.e. upon the occurrence of a clock pulse $CK_{\tau 1}$, NAND gate $A_2$ and AND gate $A_3$ are cut off as shown in graph $16a$ so that a "0" is introduced into the bit stream issuing from the latter gate; this is illustrated in the central portion of graph $18a$.

When NAND gate $A_2$ resumes conducting at the beginning of the next clock cycle, a differentiation circuit $DR_2$ connected to its output in section $M_3$ emits a spike $17a$ which resets the flip-flop $SR_1$ to terminate the gating pulse $15a$. Thus, the nonconventional bit pair "1-0" replacing the combination "1-1", as marked by shading in graphs $11a$ and $18a$ of FIG. 3, will occur only once for any positive-going pulse of data train $12a$, i.e. upon the occurrence of the first discriminating pulse $7a$ following the leading edge of such a positive-going pulse representing a secondary bit "1". A binary "0" in bit stream $12a$ is recognized from the absence of that inversion during a secondary bit period T, FIG. 6, as will become apparent hereinafter.

Figure 4:
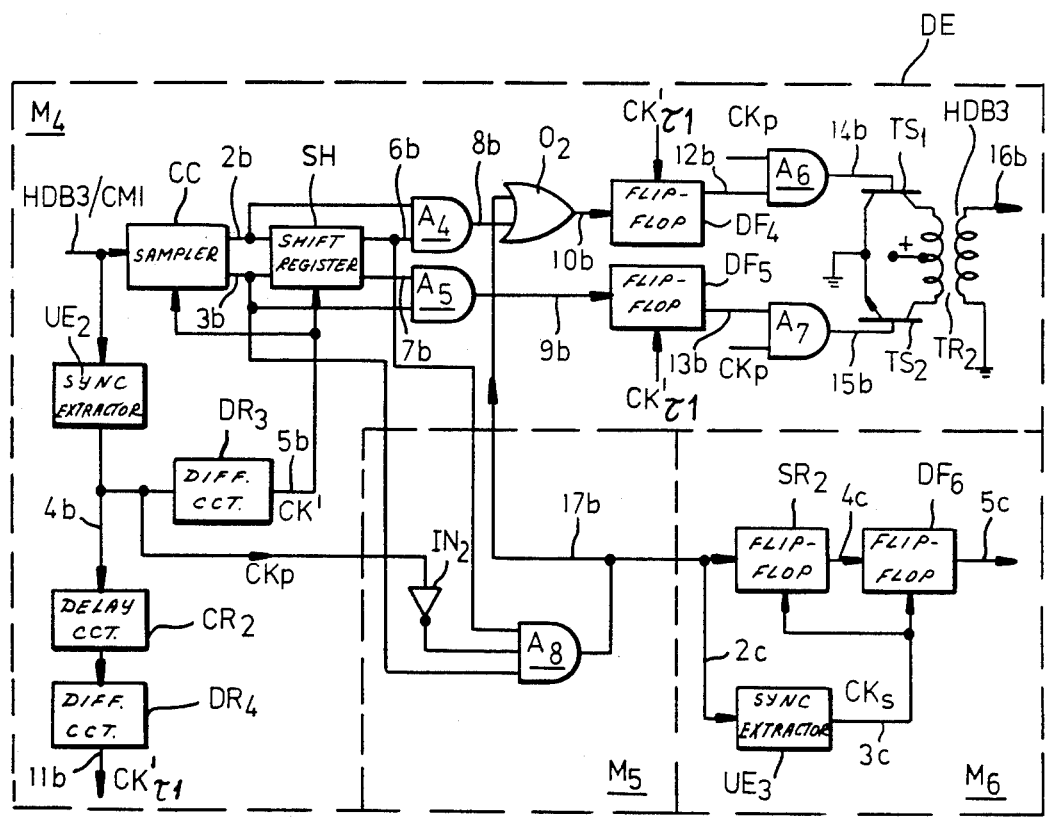
FIG. 4 is a more detailed circuit diagram of a decoder included in a receiving station of the system of FIG. 1.

Details of the decoder DE, forming part of the receiving station SR (FIG. 1), have been illustrated in FIG. 4 which shows that unit as comprising three sections $M_4$, $M_5$ and $M_6$. Section $M_4$ produces in its output a replica of the ternary HDB3 pulse train, delayed by a pulse cycle t and purged from the modifications representing the superimposed secondary data flow. Section $M_5$ emits a detection pulse, shown on a graph $17b$ of FIG. 5, whenever the incoming data flow contains the nonconventional bit pair "1-0" shaded in graph $2b$; graph $1b$ of FIG. 5 indicates the numerical values of the ternary and binary signal streams jointly transformed into this data flow at the transmitting station ST. Section $M_6$ reconstructs in its output the binary data flow generated at the transmitter by secondary data source SS.

Figure 5:
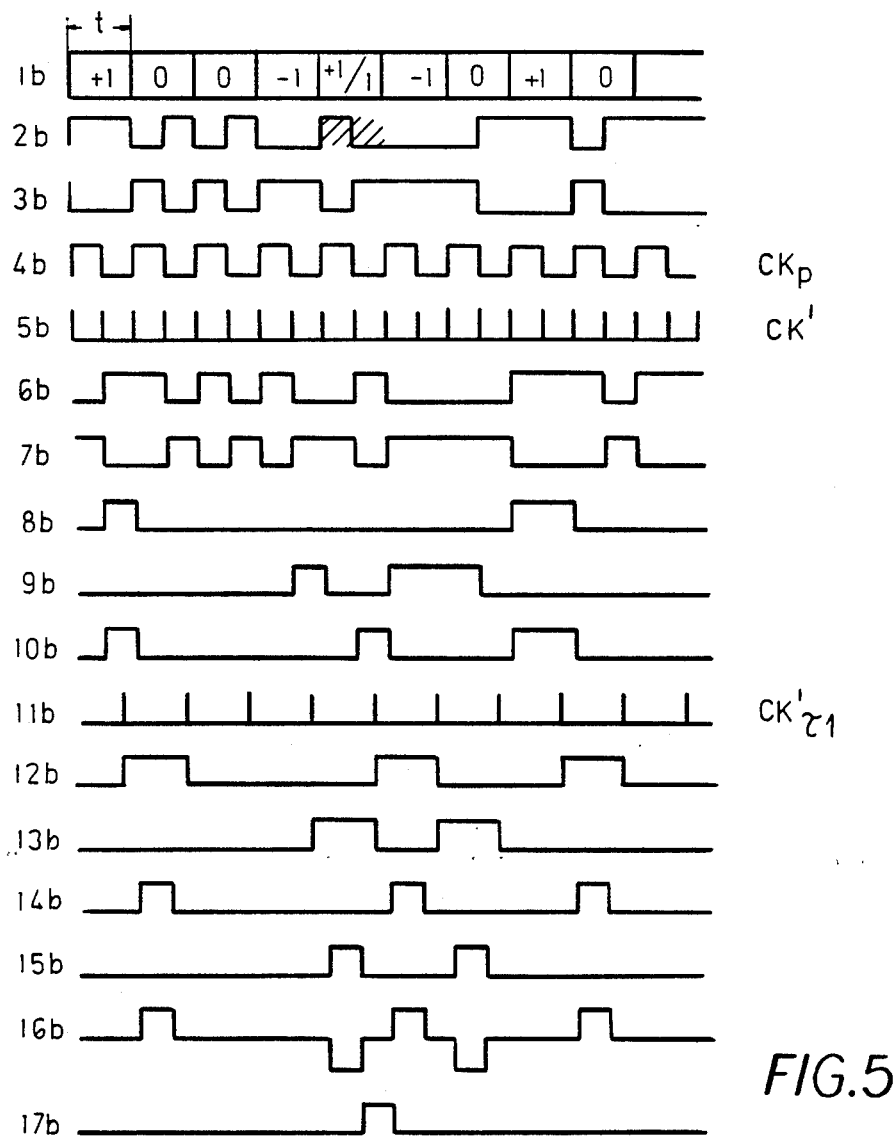
FIGS. 5 and 6 are two sets of graphs relating to the operation of the decoder of FIG. 4.

More particularly, section $M_4$ comprises a sampler CC which, together with a conventional sync extractor $UE_2$, receives the incoming data flow from the fiber-optical link FO of FIG. 1 and converts it into two complementary pulse trains, shown in graphs $2b$ and $3b$ of FIG. 5, traveling over respective signal paths. These pulse trains are fed, on the one hand, into a shift register SH and, on the other hand, into respective inputs of two AND gates $A_4$ and $A_5$ whose other inputs are tied to outputs of the shift register carrying the same pulse trains delayed by a half-cycle t/2. Sampler CC and shift register SH are stepped by spikes CK', graph $5b$, derived by a rectifying differentiator $DR_3$ from clock pulses $CK_p$ that are emitted by sync extractor $UE_2$ as shown in graph $4b$. A delay circuit $CR_2$ works into a differentiator $DR_4$ which derives another set of spikes $CK'_{\tau 1}$, graph $11b$, from clock pulses $CK_p$.

AND gates $A_4$ and $A_5$ supply their output signals, illustrated in graphs $8b$ and $9b$, to the data inputs of two flip-flops $DF_4$ and $DF_5$ which are both switchable by the spikes $CK'_{\tau 1}$, thereby producing full-cycle pulses $12b$, $13b$ in a mode of operation analogous to that described for flip-flops $DF_1$ and $DF_2$ (FIG. 2); an OR gate $O_2$ is interposed between gate $A_4$ and flip-flop $DF_4$. The lengthened pulses $12b$, $13b$ are fed to respective inputs of two further AND gates $A_6$ and $A_7$ which are periodically unblocked by clock pulses $CK_p$ applied to their other inputs. Pulses $14b$ and $15b$ respectively emitted by AND gates $A_6$ and $A_7$ are amplified by a pair of NPN transistors $TS_1$ and $TS_2$ whose collectors are connected across a centrally grounded primary of an output transformer $TR_2$; the unbalanced secondary of this transformer produces the delayed replica of the primary HDB3 flow as shown in graph $16b$.

Section $M_5$ includes an AND gate $A_8$ with three inputs receiving pulse trains $3b$ and $6b$ from sampler CC and from shift register SH, respectively, along with clock pulses $\overline{CK_p}$ passed by an inverter $IN_2$. Gate $A_8$ generates, in response to the irregular bit pair "1-0", the detection pulse $17b$ of length t/2 which it feeds back to the incoming data flow via OR gate $O_2$ to replace the "0" thereof by a "1" so as to restore the original bit combination "1-1" of the line code denoting a signal level "+1" in the primary bit stream.

Section $M_6$ comprises two further flip-flops, i.e. a set/reset flip-flop $SR_2$ and a data-type flip-flop $DF_6$, in cascade with AND gate $A_8$; the output of this gate is also connected to a sync extractor $UE_3$ which generates clock pulses $CK_s$ for resetting the flip-flop $SR_2$ and switching the flip-flop $DF_6$. Sections $M_5$ and $M_6$ comprise a second outlet means at the receiving station coupled to the decoding means $M_4$ through the AND gate $A_8$ and continually by timing means $CK_p$ for reconstructing the recording bit stream from the recurrences of the bit pair.

Figure 3:
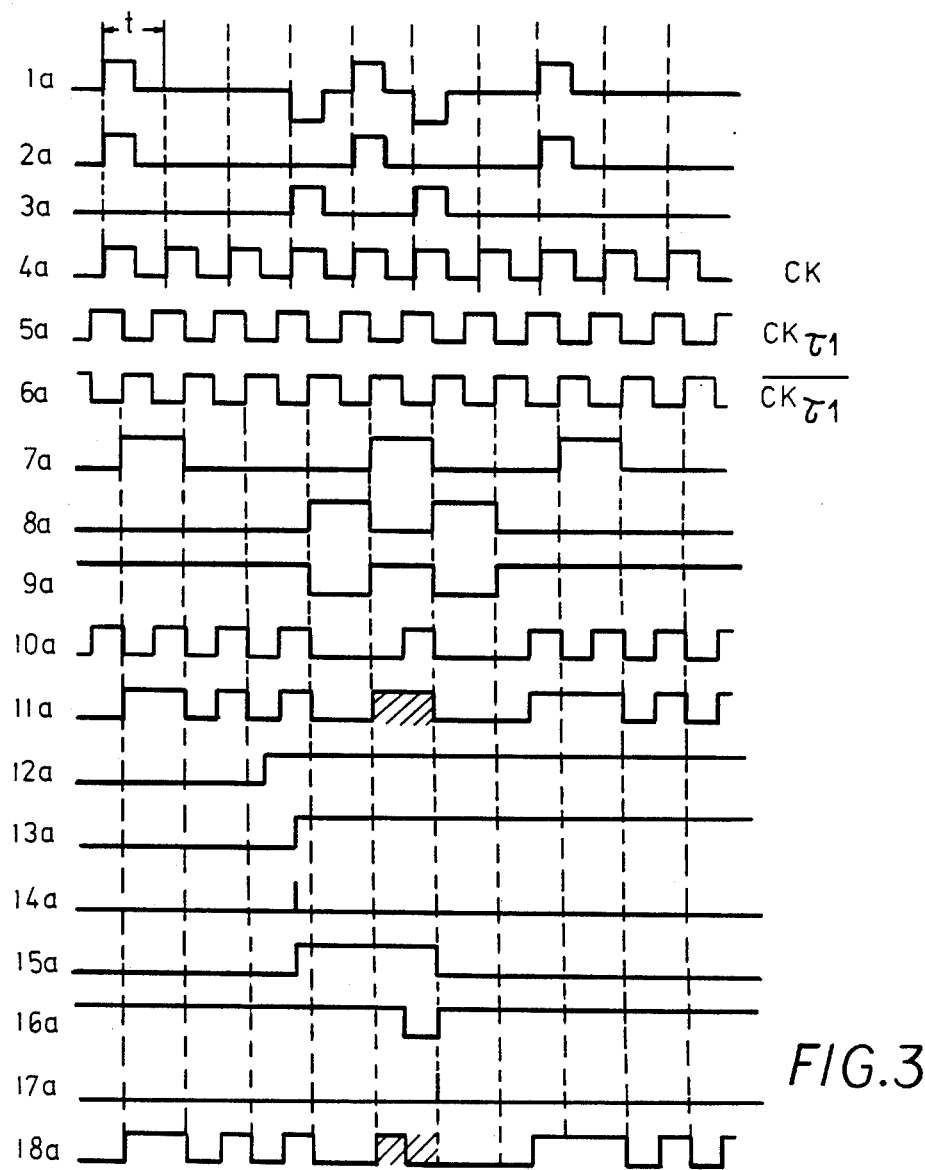
FIG. 3 is a set of graphs relating to the operation of the transcoder of FIG. 2.
Figure 6:
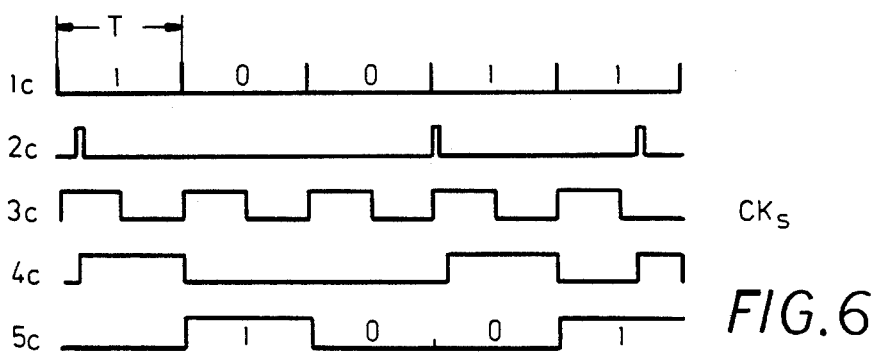

I shall describe the operation of these flip-flops with reference to the graphs of FIG. 6 whose time scale has been compressed relatively to that of FIGS. 3 and 5. Thus, graph $1c$ of FIG. 6 shows by way of example a binary signal whose cycle length T is 20 times the pulse period t of the HBD3 train and its derivations shown in the preceding Figures. Graph $2c$ shows, on a correspondingly compressed scale, a series of output pulses of section $M_5$ corresponding to those shown in graph $17b$ of FIG. 5. Pulses $17b/2c$ may occur, as indicated in FIG. 6, in various positions relative to the bit stream of graph $1c$, thus in the first half of a cycle T, at the beginning of such a period or in its second half as particularly illustrated for the three pulses depicted. The square wave extracted by circuit $UE_3$ from the output of section $M_5$, representing the clock pulses $CK_s$ shown in graph $3c$, is of course determined by the average position of pulses $2c$ so that these pulses will individually be differently phased with reference to that square wave.

Flip-flop $SR_2$ thus emits timing pulses $4c$ of varying length which are terminated by the leading edges of clock pulses $CK_s$ but not before these same leading edges have set the flip-flop $DF_6$ to produce a binary output signal $5c$ which corresponds to the secondary data stream $1c$ but is delayed by one cycle T with reference thereto.

As will be apparent from the foregoing description, consecutive detection pulses $2c$ as shown in FIG. 6 will be generated only if the irregular configuration "1-0" comes into existence at the transmitting end in each cycle T. In the transcoder UI of FIG. 2, therefore, two logical "1's" in immediatey adjoining secondary cycles T must be separated by a "0" in the input of differentiator $DF_3$. This will be the case if the secondary bit stream is suitably coded, as by the known RZ representation according to which a logical "1" (graph $1c$) is symbolized by a "1-0" bit combination.

Figure 7:
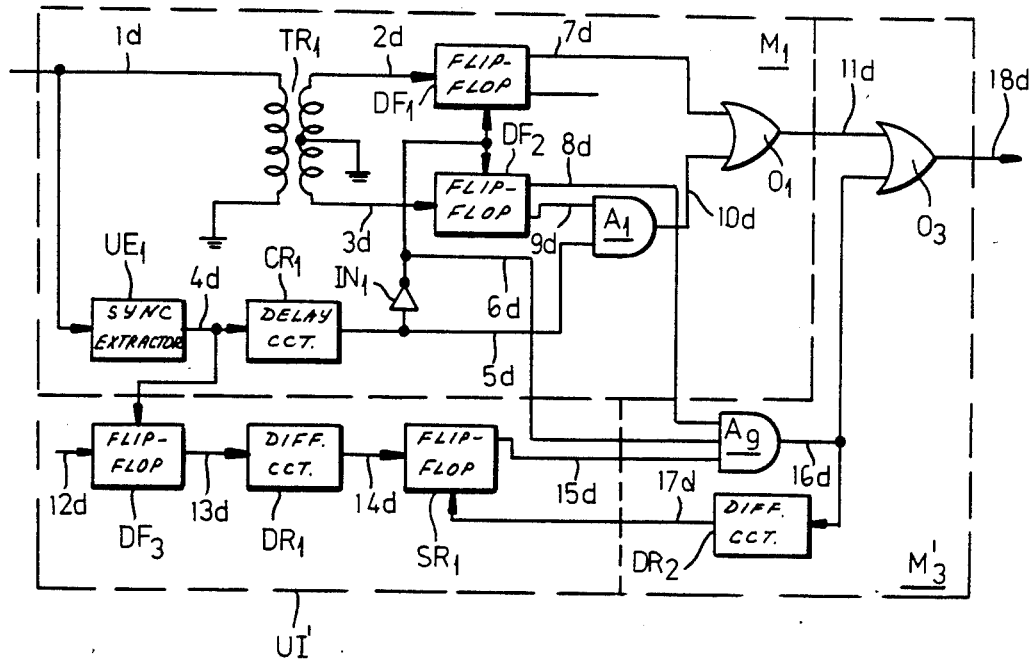
FIG. 7 is a circuit diagram illustrating a modification of the transcoder of FIG. 2.
Figure 8:
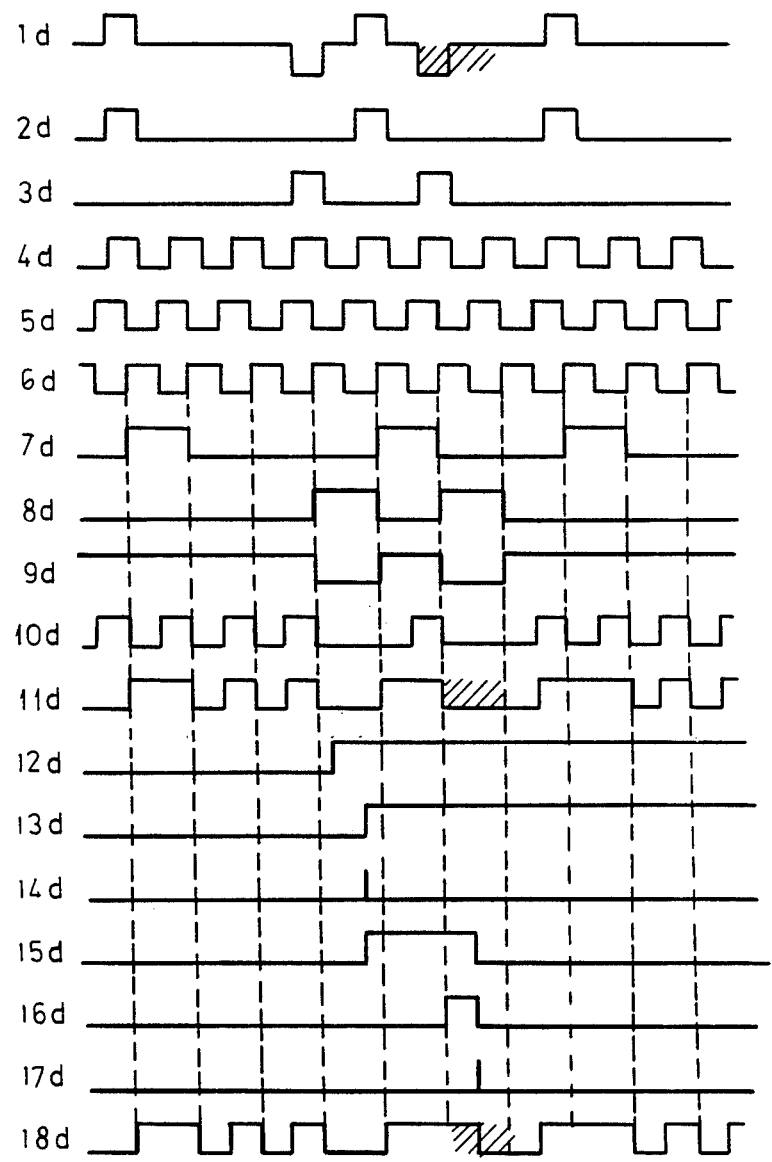
FIG. 8 is a set of graphs relating to the operation of the transcoder of FIG. 7.

In FIG. 7 I have illustrated a modified transcoder UI' according to my invention whose sections $M_1'$, $M_2'$ and $M_3'$ differ from the corresponding sections of transcoder UI (FIG. 2) only by the substitution of an AND gate $A_9$ for the NAND gate $A_2$, the replacement of AND gate $A_2$ by an OR gate $O_3$ and a change in some connections which will be described hereinafter. Signals corresponding to those of FIG. 2 have been given the same reference numerals followed by the postscript d, instead of a as in FIGS. 2 and 3, and have been depicted in graphs $1d$-$18d$ of FIG. 8.

AND gate $A_9$, like its counterpart $A_2$ in FIG. 2, has three inputs respectively carrying a discriminating pulse from the main signal channel, a gating pulse generated by the set/reset flip-flop $SR_1$ in response to a positive-going pulse in the ancillary signal channel, and a train of clock pulses. The clock pulses are the train $\overline{CK_{\tau 1}}$ available at the output of inverter $IN_1$, shown in graph $6d$, while the discriminating pulses are the output signal $8d$ of flip-flop $DF_2$. Thus, gate $A_9$ conducts in the first half of a clock cycle of length t upon a coincidence of pulses $8d$ and $15d$ to insert a "1" bit in the outgoing pulse train in lieu of the "0" then extant in the line code as part of the combination representing the ternary level "−1", as indicated by the shaded cycles of graphs $1d$, $11d$ and $18d$ in FIG. 8. The reconfiguration performed by transcoder UI', accordingly, affects the first "0—0" bit pair of the line code after a "1" bit begins to appear in the secondary bit stream.

Figure 9:
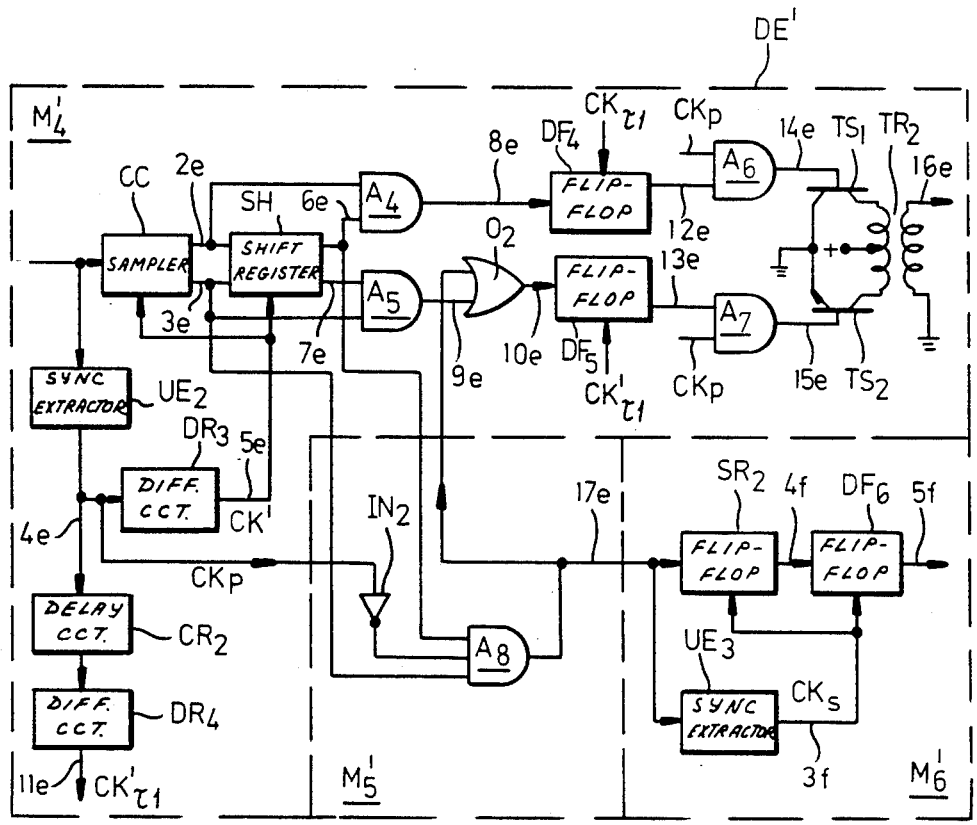
FIG. 9 is a circuit diagram illustrating a modification of the decoder of FIG. 4.
Figure 10:
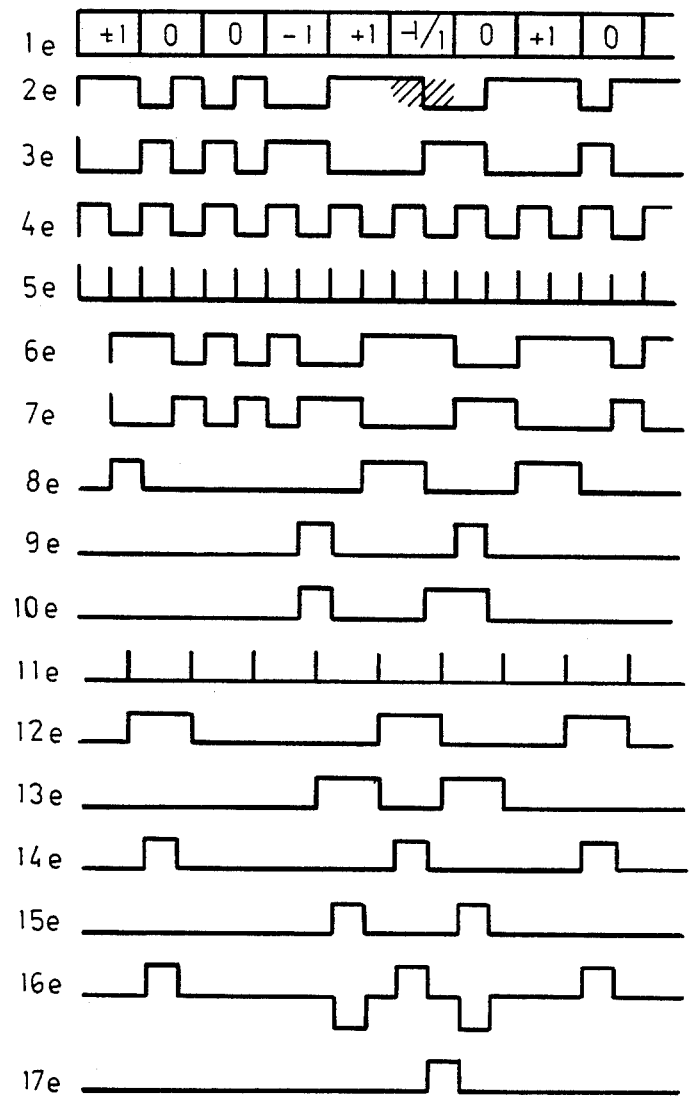
FIGS. 10 and 11 are two sets of graphs relating to the operation of the decoder of FIG. 9.
Figure 11:
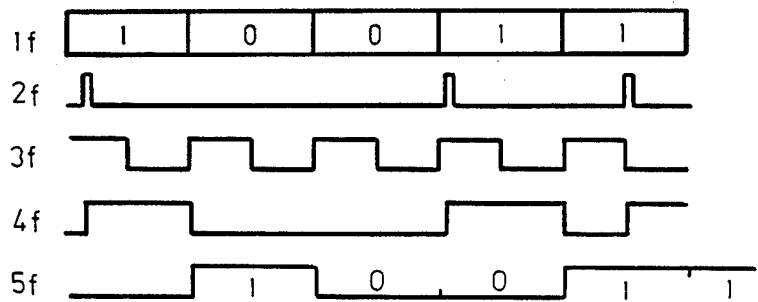

FIG. 9 shows a decoder DE' modified, with reference to decoder DE of FIG. 4, to coact in receiving station SR (FIG. 1) with the transcoder UI' in the associated transmitting station ST. Sections $M_4'$, $M_5'$ and $M_6'$ of unit DE' have the same components as the corresponding sections of unit DE, with the sole difference that OR gate $O_2$ has been shifted from the output of gate $A_4$ to that of gate $A_5$. Signals corresponding to those of FIG. 4 have been given in FIG. 9 the same reference numerals followed by the postscripts e and f, see also FIGS. 10 and 11, in lieu of postscripts b and c used in FIGS. 2, 5 and 6.

With the modification described, AND gate $A_8$ of FIG. 9 inserts a detection pulse $17e$ into the signal stream $10e$ reaching the data input of flip-flop $DF_5$, this pulse occurring in a first half of a cycle of length t during which a spike $CK'_{\tau 1}$ appears at the switching input of that flip-flop. This leads to the generation of pulses $13e$ and $15e$ which yield a negative pulse, of digital value "−1", in the replicated HDB3 code $16e$ produced by the secondary of output transformer $TR_2$.

Figure 12:
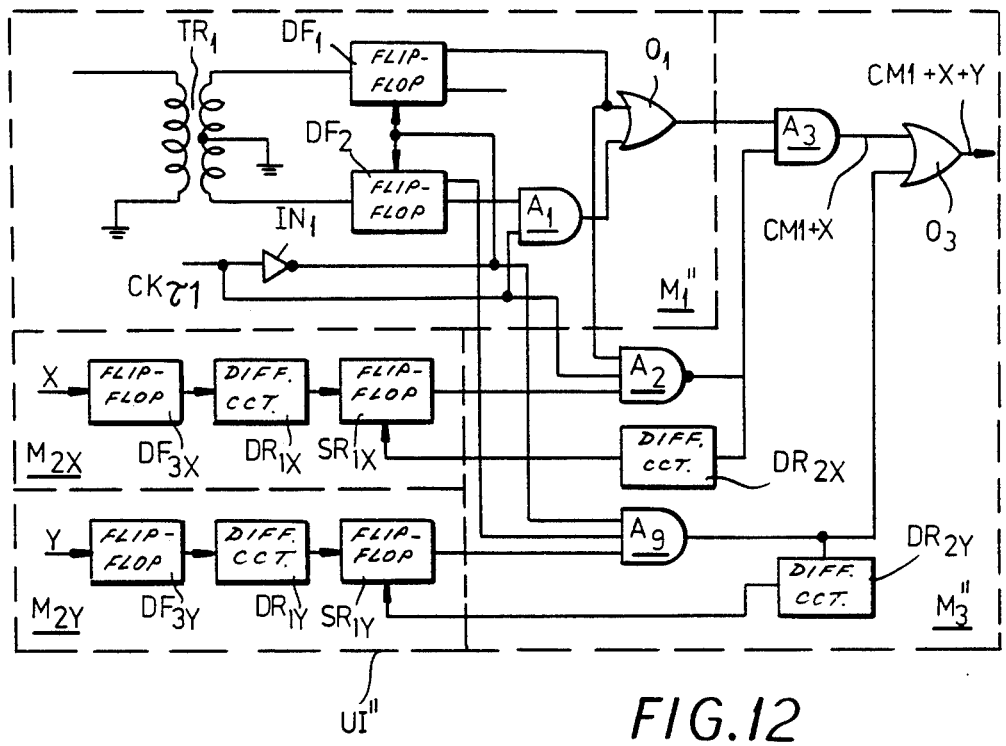
FIG. 12 is a circuit diagram illustrating a further modification of the transcoder of FIG. 2.
Figure 13:
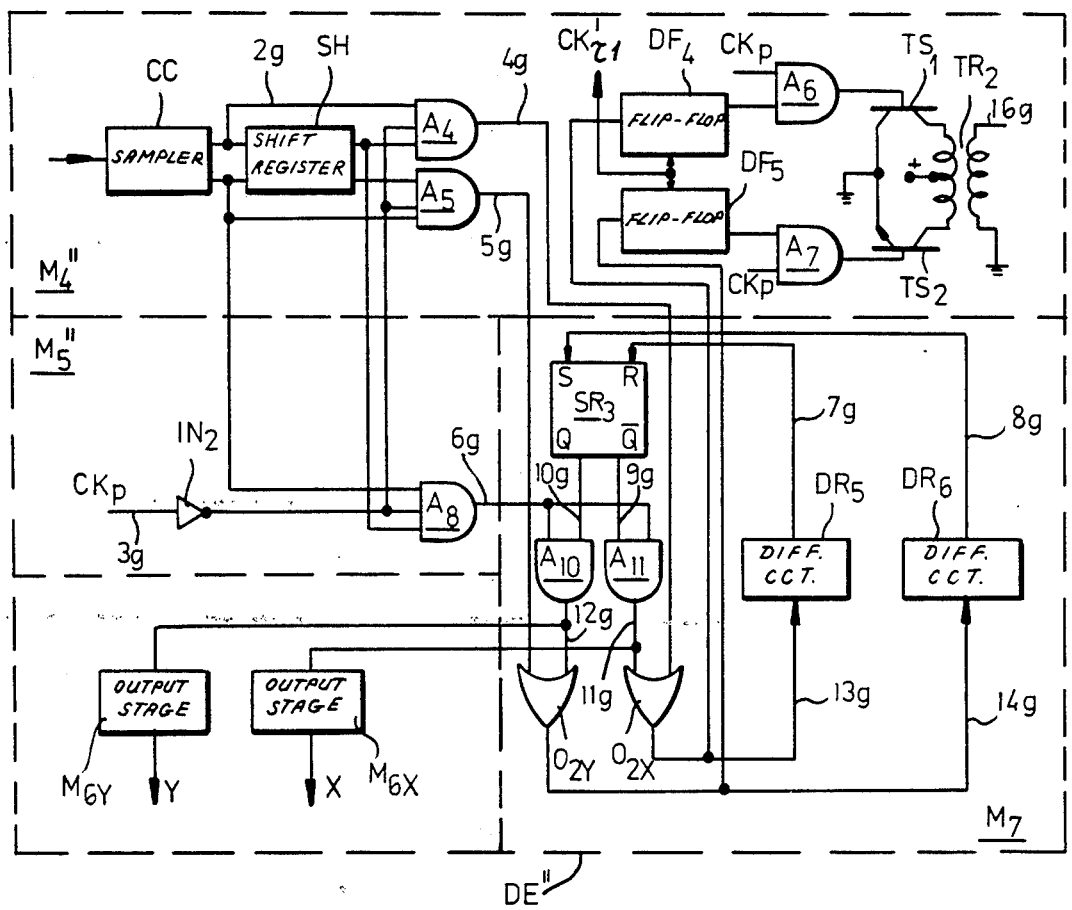
FIG. 13 is a circuit diagram illustrating a further modification of the decoder of FIG. 4.

A transcoder UI" and an associated decoder DE", respectively illustrated in FIGS. 12 and 13, combine the features of units UI, UI' and DE, DE' to handle two separate secondary bit streams through modifications of bit pairs "1-1" and "0—0" of a line code which, as described above, constitutes a binary transformation of a ternary representation of a primary bit stream of substantially higher cadence. As shown in FIG. 12, transcoder UI" has a section $M_1''$ essentially corresponding to sections $M_1$ and $M_1'$ of FIGS. 2 and 7, with components $UE_1$ and $CR_1$ omitted in the diagram for simplicity's sake. Two subsections $M_{2X}$ and $M_{2Y}$, designed to receive two binary data streams X and Y, comprise data-type flip-flops $DF_{3X}$, $DF_{3Y}$, differentiation circuits $DR_{1X}$, $DR_{1Y}$ and set/reset flip-flops $SR_{1X}$, $SR_{1Y}$, respectively. A further section $M_3''$ includes the coincidence gates $A_2$ and $A_9$ of FIGS. 2 and 7 together with two differentiation circuits $DR_{2X}$ and $DR_{2Y}$ respectively connected to the outputs of these gates in parallel with OR gates $O_1$ and $O_3$. Thus, certain bit pairs "1-1" and "0—0" of the line code are replaced by the nonconventional configuration "1-0" in the manner already explained.

The decoder DE" of FIG. 13 has an input section $M_4''$ containing all the common components of sections $M_4$ and $M_4'$ (FIGS. 4 and 9), a section $M_5''$ corresponding to sections $M_5$ and $M_5'$ of the preceding embodiments, two subsections $M_{6X}$ and $M_{6Y}$ forming output stages for the separate emission of reconstituted data streams X and Y, and a supplemental section $M_7$. The latter comprises two further AND gates $A_{10}$ and $A_{11}$ with inputs connected in parallel to the output of AND gate $A_8$, OR gates $O_{2X}$ and $O_{2Y}$ taking the place of gates $O_2$ in FIGS. 4 and 9, respectively, two inverting differentiation circuits $DR_5$ and $DR_6$ connected to the outputs of these OR gates, and a monitoring flip-flop $SR_3$ having a setting input S tied to the output of circuit $DR_5$, a resetting input R tied to the output of circuit $DR_6$, a set output Q joined to a second input of gate $A_{10}$ and a reset output $\overline{Q}$ joined to a second input of gate $A_{11}$. Gate $A_{10}$ has its output connected in parallel to stage $M_{6Y}$ and to one input of gate $O_{2Y}$ whose other input is connected to the output of gate $A_5$; similarly, gate $A_{11}$ has its output connected in parallel to stage $M_{6X}$ and to one input of gate $O_{2X}$ whose other input is connected to the output of gate $A_4$. Gates $A_4$ and $A_5$ each have a third input connected in parallel with an input of gate $A_8$ to the output of inverter $IN_2$ carrying clock pulses $\overline{CK_p}$.

Figure 14:
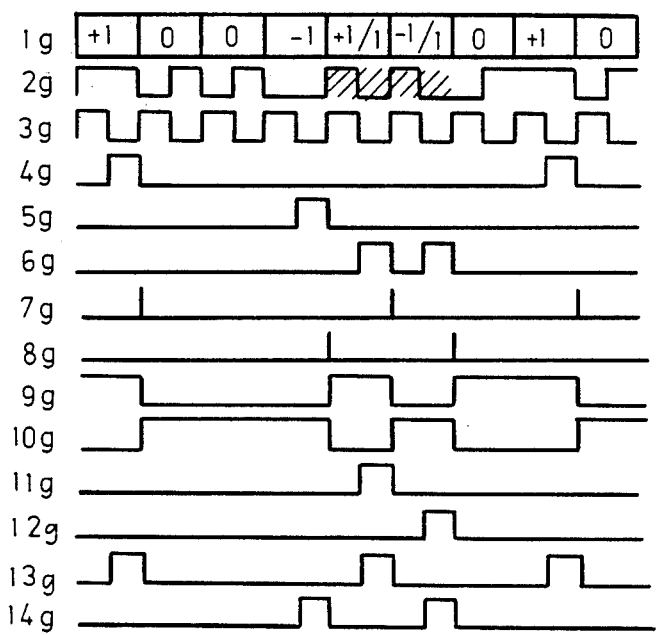
FIG. 14 is a set of graphs relating to the operation of the decoder of FIG. 13.

The operation of decoder DE" will be described with reference to FIG. 14 whose first two graphs $1g$ and $2g$ show the composite tertiary/binary signal stream converted by transcoder UI" and the resulting bit stream arriving at the decoder; two cycles of that signal stream, in which the nonconventional bit pair "1-0" has replaced two combinations "1-1" and "0-0" of the line code standing for ternary "+1" and "−1", respectively, have been marked by shading in graph $2g$. Graph $3g$ shows clock pulses $CK_p$ while the remaining graphs $4g$-$14g$ respectively represent the signals emitted by gates $A_4$, $A_5$, $A_8$, differentiators $DR_5$, $DR_6$, reset and set outputs $\overline{Q}$, Q of flip-flop $SR_3$, gates $A_{11}$ and $A_{12}$ as well as gates $O_{2X}$ and $O_{2Y}$.

The inverted clock pulses $\overline{CK_p}$ prevent any of the gates $A_4$, $A_5$, $A_8$, $O_{2X}$ and $O_{2Y}$ from conducting in the first half of a cycle. When gate $A_4$ emits a pulse $4g$ in response to a bit pair "1-1" representing the ternary level "+1", circuit $DR_5$ generates a spike $7g$ resetting the flip-flop $SR_3$ on the trailing edge of that pulse and unblocking the gate $A_{10}$. In an analogous manner, the appearance of a pulse $5g$ in the output of gate $A_5$—in response to a bit pair "0-0" representing the ternary level "−1"—causes circuit $DR_6$ to generate a spike $8g$ resetting the flip-flop $SR_3$ and unblocking the gate $A_{11}$. Since, as discussed above, levels "+1" and "−1" alternate so that a configuration "0-0" will always intervene between two bit pairs "1—1" and vice versa, a detection pulse $6g$ in the output of gate $A_8$—denoting the nonconventional bit combination "1-0"—will be indicative of a pair "1-1" modified by a "1" bit signal X or of a pair "0—0" modified by a "1" bit of signal Y, depending on whether that detection pulse occurs in the reset or in the set state of monitoring flip-flop $SR_3$. Thus, the first pulse of graph $6g$ coincides with a pulse $9g$ so as to pass gate $A_{11}$ whereby a pulse $11g$ enters the output stage $M_{6X}$ while also traversing the OR gate $O_{2X}$ to set the previously reset flip-flop $SR_3$ in the same manner as would have been the case if gate $A_4$ had detected the unmodified bit pair "1—1" in the cycle occupied by pair "1-0". When, as shown by way of example, the next cycle also carries this irregular combination instead of an original pair "0—0", gate $A_{10}$ conducts and emits a pulse $12g$ to output stage $M_{6Y}$ and OR gate $O_{2Y}$, causing another reversal of flip-flop $SR_3$. With flip-flop $SR_3$ faithfully registering the alternation of levels "+1" and "−1", the two mutually independent secondary data streams X and Y are unequivocally recovered while the repristinated line code gives rise to a replica of the original HDB3 representation as in the preceding embodiments.

It ought to be apparent that my invention is applicable to any transmission system of the type here discussed which utilizes three out of four possible bit pairs in its line code. The secondary bit streams could also be introduced and/or retrieved at any of the regenerators $RG_1$-$RG_n$ shown in FIG. 1, as more fully described in my copending application identified above.

The codes HDB3 and HDB3/CMI referred to above are specific instances of the 3-level and 2-level representations of the so-called AMI (alternate mark inversion) pulse formats described, for example, in an article titled "Optical Pulse Formats for Fiber Optic Digital Communications" by Yoshitaka Takasaki, Mitsuo Tanaka, Narimichi Maeda, Kiichi Yamashita and Katsuyuki Nagano, published April 1976 in IEEE TRANSACTIONS ON COMMUNICATIONS, Vol. Com-24, No. 4, pages 404-413. Thus, my invention is applicable to any code of this general character.

I claim:

1. A system for jointly forwarding high-frequency and low-frequency digital signals over a physical carrier linking a transmitting station with a receiving station, comprising:
    a first data source at said transmitting station emitting a terntary representation of a primary bit stream;
    a second data source at said transmitting station emitting a secondary bit stream with a cycle length substantially greater that that of said primary bit stream;
    transcoding means interposed at said transmitting station between said data sources and said physical carrier for converting said ternary representation into a binary configuration of twice the bit rate thereof with three out of four possible two-bit combinations symbolizing respective levels "+1", "−1" and "0" of said ternary representation, said transcoding means substituting a bit pair constituting the fourth of said two-bit combinations for at least one of the two first-mentioned combinations in said binary configuration in response to the presence of a logical "1" in said secondary bit stream;
    decoding means at said receiving station coupled to said physical carrier for detecting said bit pair in an incoming pulse train emitted by said transcoding means;
    timing means at said receiving station coupled to said decoding means for determining the cycle length of said secondary bit stream from recurrences of said bit pair in said incoming pulse train;
    first output means at said receiving station coupled to said decoding means for generating a replica of said primary bit stream from said incoming pulse train; and
    second output means at said receiving station coupled to said decoding means and to said timing means for reconstructing said secondary bit stream from the recurrences of said bit pair.

2. A system as defined in claim 1 wherein said physical carrier is an optical fiber.

3. A system as defined in claim 1 wherein said transcoding means comprises polarity-inverting circuitry connected to said first data source for producing said binary configuration, discriminating means coupled to said polarity-inverting circuitry for detecting the presence of a predetermined combination of two identical bits in a cycle of said binary configuration, differentiation and bistable means in series and connected to said second data source for generating a gating pulse upon the appearance of a logical "1" in said secondary bit stream, and reconfiguration means connected to and controlled by said discriminating means for replacing said predetermined combination in the presence of said gating pulse with said bit pair.

4. A system as defined in claim 3 wherein said bistable means comprises a flip-flop settable by a leading edge of a signal pulse representing said logical "1".

5. A system as defined in claim 3 wherein said polarity-inverting circuitry includes an input transformer having an unbalanced primary winding connected to said first data source and a balanced secondary winding connected across two symmetrical branches for producing said binary configuration.

6. A system as defined in claim 5 wherein said first output means comprises an output transformer with a balanced primary winding connected across said branches and an unbalanced secondary winding connectable across a load.

7. A system as defined in claim 3 wherein said discriminating means comprises first synchronization-extraction means connected to said first data source for generating a train of first clock pulses, each occupying half a cycle of said binary configuration, and a respective data flip-flop in each of two separate branches for setting by said first clock pulses during respective cycles in which said ternary representation contains pulses of opposite polarities; said reconfiguration means comprising first coincidence-gate means with inputs connected to said bistable means, to said first synchronization means and to an output of at least one of said data flip-flops; said decoding means comprising second synchronization-extraction means for generating from said incoming pulse train a train of second clock pulses of the same duration and recurrence rate as said first clock pulses, sampling means connected to said second synchronization-extraction means and controlled by said second clock pulses for emitting two mutually complementary trains of data pulses on respective signal paths in conformity with said incoming pulse train, shift-register means inserted in said signal paths for delaying said trains of data pulses by half a clock cycle, and second coincidence-gate means with respective inputs connected to the respective signal paths at points respectively located upstream and downstream of said shift-register means and with a third input connected to said second synchronization-extraction means for emitting a detection pulse upon the simultaneous occurrence of signal pulses at said points in a half of a clock cycle marked by a second clock pulse.

8. A system as defined in claim 7 wherein said two first-mentioned combinations alternate in said ternary representation and are subject to transformation into said bit pair at said transcoding means under the control of two mutually independent secondary bit streams, said first coincidence-gate means comprising two gates with inputs respectively connected to outputs of said pair of data flip-flops, said decoding means including a monitoring flip-flop with a setting input connected to said first synchronization-extraction means and a resetting input connected to said second coincidence-gate means for registering the alternation of said first-mentioned combinations along with bit pairs replacing same in said incoming pulse train to determine the character of the replaced combinations, said second output means being controlled by said monitoring flip-flop to separate the detection pulses derived from bit pairs replacing two-bit combinations of different character.

9. A system as defined in claim 7 wherein said second output means comprises a set/reset flip-flop and a third data flip-flop in cascade with each other, said set/reset flip-flop being settable by a detection pulse from said second coincidence-gate means and resettable by a control pulse from said second synchronization extraction means, said third data flip-flop having a data input connected to an output of said set/reset flip-flop and being switchable by said control pulse.

* * * * *